(12) United States Patent
Tsubuku

(10) Patent No.: US 6,239,234 B1
(45) Date of Patent: May 29, 2001

(54) POWDER COATING PREPARED FROM PET RESIN-PRODUCTS AS RAW MATERIAL AND PROCESS FOR THE PREPARATION THEREOF

(75) Inventor: Yukihisa Tsubuku, Hanyu (JP)

(73) Assignee: K. K. Seishin Kigyo, Tokyo (JP)

( * ) Notice: Subject to any disclaimer, the term of this patent is extended or adjusted under 35 U.S.C. 154(b) by 0 days.

(21) Appl. No.: 09/172,265

(22) Filed: Oct. 14, 1998

(51) Int. Cl.⁷ .................... C08L 67/02; C09D 167/02
(52) U.S. Cl. .................... 525/444; 525/176; 525/439; 241/23
(58) Field of Search ................ 525/444; 241/23

(56) References Cited

U.S. PATENT DOCUMENTS

| | | | |
|---|---|---|---|
| 3,382,295 | * | 5/1968 | Taylor . |
| 3,435,093 | * | 3/1969 | Cope . |
| 3,956,229 | * | 5/1976 | Bollen . |
| 4,243,712 | * | 1/1981 | Hoheisel . |
| 4,357,385 | * | 11/1982 | Kuroda . |
| 4,670,508 | * | 6/1987 | Ohdaira . |

FOREIGN PATENT DOCUMENTS

042747 * 4/1976 (JP) .

* cited by examiner

*Primary Examiner*—David J. Buttner
(74) *Attorney, Agent, or Firm*—Oblon, Spivak, McClelland, Maier & Neustadt, P.C.

(57) ABSTRACT

A composition for powder coating, which comprises a melt blend of 100 weight parts of PET resin pellets or small pieces obtained from recovered PET resin molded products with (i) 5–40 weight parts of a polyester resin (excluding PET) or a modified polyester resin, (ii) 3–30 weight parts of modified polyolefin resin or ethylene acrylic acid copolymer resin, or (iii) 3–30 weight parts of polycarbonate resin, the powder material exhibiting an improved ability to adhere to metal surfaces.

4 Claims, No Drawings

POWDER COATING PREPARED FROM PET RESIN-PRODUCTS AS RAW MATERIAL AND PROCESS FOR THE PREPARATION THEREOF

BACKGROUND OF THE INVENTION

Field of the Invention

The present invention relates to PET resin powder capable of forming a coating film or paint film by close adhesion to the surface of a metal, or the like, and to a process of preparation. The present invention permits the use of small broken pieces of recovered containers such as PET bottles as raw PET resin material.

PET (polyethylene terephthalate) resin exhibits low adhesivity to the surface of metal. Moreover, even when a baked coated film is formed from the material, crystallization of the coated film progresses which results in the development of the tendency to craze or peel. Accordingly, the resin is normally not utilized as a powder coating (powder paint). In addition, PET resins and other thermoplastic resins generally have low heat resistance and are elastic. Consequently, when machine grinding is performed at ordinary temperatures, ground particles have strand-like or whisker-like projections exceeding 1 mm in length, making it impossible to handle the polymer as a so-called powder. Generally, the particle size of powder for electrostatic coating is required to be 5–150 μm (average particle diameter 40 μm) and that of powder for fluidization dip, 60–350 μm (average particle diameter 150 μm). Accordingly, it is very difficult to prepare a fine powder (5–350 μm) suitable for powder coating, or the like, by means of ordinary machine grinding. Grinding is presently performed by refrigeration grinding method using liquid nitrogen. Refrigeration grinding requires a large quantity of liquid nitrogen, and it is also necessary to adapt grinding machines and other peripheral devices to specific applications which are capable of enduring low temperature environments. This necessitates the provision of large scale equipment with a resulting increase in grinding costs.

SUMMARY OF THE INVENTION

It Accordingly, one object of the present invention is to impart close adherence to PET resin with poor metal adhesion and provides a powder coating which is applicable to electrostatic coating and fluidization dip processes.

Another object of the invention is provide a powder coating which can utilize, as a raw material recovered food containers such as PET bottles, disposal of which has recently become a serious social problem.

Briefly, these objects and other objects of the present invention as hereinafter will become more readily apparent can be attained by a composition for powder coating, which comprises a melt blend of 100 weight parts of PET resin pellets or small pieces obtained from recovered PET resin molded products with (i) 5–40 weight parts of a polyester resin (excluding PET) or a modified polyester resin, (ii) 3–30 weight parts of modified polyolefin resin or ethylene unsaturated carboxylic acid copolymer resin, or (iii) 3–30 weight parts of polycarbonate resin, the powder material exhibiting an improved ability to adhere to metal surfaces.

DETAILED DESCRIPTION OF THE PREFERRED EMBODIMENTS

In the present process PET resin pellets or flakes obtained by "machine grinding" of recovered PET products or pellets obtained by further melt-kneading of the above flakes by means of an extruder are mixed with modifiers which improve metal adhesion and molten film forming properties. The resulting mixture is melt-kneaded by means of an extruder to provide composite pellets, and then the pellets are heated at 170° C. for a predetermined time to achieve a degree of crystallinity of 35% or higher. The pellets are then machine ground or dissolved in a common solvent to provide chemically fine powder.

Suitable examples of modifiers include polyester resins excluding PET, e.g. polybutylene terephthalate, polyethylene naphthalate, modified polyester resins, polyolefine resins acid-modified with unsaturated carboxylic acids or anhydrides thereof, e.g. acrylic, methacrylic, maleic, fumaric, and itaconic acids; maleic anhydride, itaconic anhydride, and the like, and further copolymer resins of the acids with olefins, or polycarbonate resins.

The baking temperatures of the modified polyester resins can be lowered by converting the resin to a kneaded mixture of e.g. 40 wt. % PET resin, 40 wt. % PBT resin, and 20 wt. % low molecular olefin wax with adhesive properties. The compounding amounts of the respective modifiers are 5–40 weight parts, preferably 20 weight parts or thereabout, based on 100 weight parts of raw PET resin. Concerning the polyolelfins acid-modified with unsaturated carboxylic acid or anhydrides thereof, maleic anhydride-modified polyolefins are preferred with respect to the property of close adherence. The maleic anhydride-modified polyolefins are prepared by kneading 100 weight parts of low molecular olefin resins with 10–40 weight parts of maleic anhydride, preferably 30 weight parts of the latter for close adherence. The compounding amount of the maleic anhydride-modified olefin resin is in the range of 3–30 weight parts, preferably 5–20 weight parts, of the maleic anhydride per 100 weight parts of PET resin. Also in the case of using, as modifier, a copolymer resin of acrylic acid, or the like, with olefins, or a polycarbonate resin, its compounding amount is 3–30 weight parts. Since the present invention has as one of the objects utilization of recovered PET resin, it is desired from this viewpoint that the amount of the modifier blended be held as small as possible. However, since small added amounts cause lesser improvements in metal adherence, increases in the hardness of the coating film, tendencies to reduce anti-impact strength, the added amount is adjusted according to the coated film performance desired.

The modifier can be used either singly or in combination. The degree of crystallinity of the composition pellets containing the respective modifiers is in the range of 20–30%, and machine grinding of the pellets as such by normal method will produce whisker-like projections on the surface of ground particles, which renders their utilization as a powder coating impossible. However, heating the pellets to 166±10° C., which is the range of crystallization temperature of PET resin, which is the base material, or heating to 170° C. for several hours, which is applicable for industrial purposes, can increase the degree of crystallinity (to be sought by DSC analysis). When machine grinding is effected after the degree of crystallinity of 35% or more is achieved, whisker projections are no longer produced and spherical particles dominate. Moreover, the grinding time tends to be shortened in proportion to the degree of crystallinity.

Having now generally described the invention, a further understanding can be obtained by reference to certain specific examples which are provided herein for purpose of illustration only and are not intended to be limiting unless otherwise specified.

EXAMPLE 1

PET resin pellets (commercial product), regenerated from recovered PET bottles, polybutylene terephthalate (PBT)

resin (Ube Kosan KK, PET 1000F01) and titanium dioxide (Ishihara Sangyo KK, CR-97) were introduced into a tumbler in the compounding proportions set out in Table 1, mixed and knead-extruded at 270° C. through a biaxial extruder (PMT-32, IKG KK). The resulting strands were stretched through the water and after a diameter of 2 mm had been attained, they were cut to about 3 mm in length by a cutter and converted into pellets for the respective formulations.

TABLE 1

|  | PET weight parts | Polybutylene terephthalate weight parts | Titanium dioxide weight parts |
| --- | --- | --- | --- |
| Formulation 1 | 99 | 1 | 2.63 |
| Formulation 2 | 95 | 5 | 2.63 |
| Formulation 3 | 90 | 10 | 2.63 |
| Formulation 4 | 80 | 20 | 2.63 |

The degree of crystallinity of the pellets obtained was 30% or less in all formulations. Grinding of these pellets at ordinary temperatures would produce 1–2 mm long whisker-like projections on the surfaces of the ground particles, thus stymieing their use in powder coating formulations.

When the pellets were heated at 170° C. for 6 hours using a conical blender with an oil jacket, the crystallization degrees were increased to 35% or more. Subsequently, they were allowed to cool to ordinary temperatures and then fed into a high speed spiral mill (KK Seishin Kigyo, SP-420 type, rated output 22 kw) with a rotating blade spacing of 0.4 mm, and a rotation rate of 5,000 rpm at a processing rate of 30 kg/h by means of a table feeder, and grinding was conducted. The ground product was then passed through a classifier equipped with a 300 $\mu$m screen (Hi-bolter-NR-460S, Shin Tokyo Kikai KK) so that coarse particles exceeding 300 $\mu$m were eliminated. The eliminated powder was then recycled to the aforementioned high speed spiral mill. The closed circuit grinding was conducted for one hour. The average particle diameter of the powder obtained was about 180 $\mu$m (particle diameter range 45–355 $\mu$m). The degree of crystallinity of each formulation, when the heating time was 17 hours, is set out in Table 2, and the load current of the grinder also decreased in proportion to the degree of crystallinity. Sifting measuring equipment (KK Seishin Kigyo, PRS-85) was used for the determination of the particle size distribution.

TABLE 2

|  | Degree of crystallinity |
| --- | --- |
| Formulation 1 | 47% |
| Formulation 2 | 45% |
| Formulation 3 | 51% |
| Formulation 4 | 48% |

*The degrees of crystallinity were obtained from a graph prepared from DSC analysis data.

EXAMPLE 2

An 80 kg amount of PET resin pellets regenerated from recovered PET bottles, 20 kg polycarbonate resin (Teijin KK, Panlite K-1300) and 2.63 kg titanium dioxide (Ishihara Sangyo KK, CR-97) were charged into a tumbler and mixing was effected. Subsequently, kneading was performed with an apparatus and under conditions similar to Example 1 in order to provide coarse pellets. The heating time required until the degree of crystallinity of the pellets had exceeded 35% was 8 hours. After one hour operation of the grinder, a powder was obtained whose particles had an average particle diameter of 190 $\mu$m (particle diameter range: 53–425 $\mu$m). Heating of the same coarse pellets at 170° C. for 17 hours increased the degree of crystallinity to 41%, and 40-hour heating treatment increased the degree of crystallinity to 45%. A powder material having an average particle diameter of 180 $\mu$m (particle diameter range: 53–425 $\mu$m) was obtained.

EXAMPLE 3

A 100 kg amount of PET resin pellets regenerated from recovered PET bottles, 5 kg ethylene acrylic acid copolymer resin (Dow Chemical, Primacol 3460) and 2.63 kg titanium dioxide (Ishihara Sangyo KK, CR-97) were charged into a tumbler and mixing was effected. Subsequently, kneading and grinding were conducted with an apparatus similar to that of Example 1. The heating time required until the degree of crystallinity of the pellets reached 35% was 8.5 hours, and further heating was continued to increase the degree of crystallinity to 39% in 17 hours. One hour grinding of the obtained pellets yielded powder particles of an average particle diameter of 200 $\mu$m (particle diameter range: 53–425 $\mu$m).

EXAMPLE 4

An 80 kg amount of PET resin pellets regenerated from recovered PET bottles, 20 kg polyethylene naphthalate resin (Teijin) and 2.63 kg titanium dioxide (Ishihara Sangyo KK, CR-97) were charged into a tumbler and mixing was effected. Subsequently, kneading and grinding were performed with an apparatus similar to that of Example 1. The heating time required until the degree of crystallinity reached 35% at 170° C. was 6 hours, and further heating was continued to increase the degree of crystallinity to 52%. One-hour grinding of the pellets obtained yielded powder of an average particle diameter of 190 $\mu$m (particle diameter range: 45–425 $\mu$m).

EXAMPLE 5

An 80 kg amount of PET resin pellets regenerated from recovered PET bottles, 20 kg of polyethylene maleate (KK Nakada Coating), and 2.63 kg titanium dioxide (Ishihara Sangyo KK, CR-97) were charged into a tumbler and mixing was effected. Subsequently, kneading and grinding were performed under conditions similar to those described in Example 1. The degree of crystallinity attained by a 10-hour heating treatment at 170° C. was about 36%, and a powder of an average particle diameter of 210 $\mu$m (particle diameter range: 75–425 $\mu$m) were obtained.

The powder particle sizes of the respective Examples were obtained by one-hour machine grinding, and it is obvious that elongated grinding times will increase the proportions of smaller diameter particles. Accordingly, in actual production, grinding is performed with a grinding time suited to the application, and then, classification is effected to predetermined particle ranges.

EXAMPLE 6

A 2 kg mixture of pellets prepared in Example 1 (PET resin, PBT resin, and titanium dioxide) was introduced into a stirred dissolution tank with jackets containing 40 liters dimethylacetamide, and the mixture was dissolved by heating to 172° C. Upon cooling below 60° C. by water cooling, particles were separated, and then filtration was conducted by means of a filter press in order to separate the solvent, and the filtered cake was introduced into a stirred vacuum dryer, where it was dried at 12 rpm at 70° C. under a vacuum degree of 10 Torr, yielding powder. The yield was 95% by weight ratio. Subsequently, this powder was fed to a Jet Mill (KK Seishin Kigyo, FS-4) at a processing rate of 1 kg/h in order to crush the agglomerated particles, yielding a fine powder of an average particle diameter of 45 $\mu$m (particle diameter range: 10–128 $\mu$m). The particle size distribution was determined using a laser diffraction dispersion system particle size measuring machine (KK Seishin Kigyo, LMS-30), using a 0.1% aqueous solution of sodium dodecylsulfate as the dispersion medium, and also by ultrasonic dispersion.

EXAMPLE 7

A 2 kg mixture of pellets prepared in Example 2 was charged in a stirred dissolution tank with jackets containing 40 liters of methylacetamide, and the mixture was dissolved by heating to 170° C. Upon cooling below 60° C. by water cooling, particles were separated, and then filtration was conducted by means of a filter press in order to separate the solvent, and the filtered cake was introduced into a stirred vacuum dryer, where it was dried at 12 rpm at 70° C. under a vacuum degree of 10 Torr, yielding a powder. The yield was in a 95% by weight ratio. Subsequently, this powder was fed to a Jet Mill (KK Seishin Kigyo, FS-4) at a processing rate of 1 kg/h in order to crush the agglomerated particles, yielding a fine powder of average particle diameter of 40 $\mu$m (particle diameter range: 10–128 $\mu$m). A determination of particle size distribution was made by a method identical to that of Example 6.

Coating Film Test

The powder prepared by Examples 1–5 was classified through a 300-mesh sieve and the respective fractions were introduced into fluidization dipping tanks, into which SS steel plates (50×100×1.5 tmm) heated to a surface temperature of 300° C. were dipped for three seconds in order to form about 400 $\mu$m-thick coating films thereon. The coated steel plates were used as test specimens for a coating film test.

On the other hand, the fine powder prepared by Examples 6 and 7 were sprayed onto the steel plates similar to those described above for 4 seconds at an applied voltage of −50 KV using an electrostatic coating machine (Nihon parkarizing KK), after which these steel plates were placed in an electric oven heated to 350° C. for two minutes to form coating films about 50 $\mu$m in thickness.

These test specimens were subjected to an impact test and measured for pencil hardness using squares adhesion test (tape peeling method, 2×2 mm square, 25 squares) and a duPont impact tester (Toyo Seiki KK, 1 m height, weight 300 g, front end radius 7 mm) in accordance with JIS K 5400. These measurements were conducted at a room temperature of 23±2° C.

The results are shown in the following table:

TABLE 3

Results of coating film test: (allowed to cool)

| | Adherence (X/25) X: number of squares to which specimens adhere | Impact resistance | Pencil hardness |
|---|---|---|---|
| Example 1 Formulation 1 | 4/25 | cracks and peeling occur | 2H |
| Example 1 Formulation 2 | 25/25 | some cracks occur | 2H |
| Example 1 Formulation 3 | 25/25 | some cracks occur | 2H |
| Example 1 Formulation 4 | 25/25 | some cracks occur | 2H |
| Example 2 | 25/25 | some cracks occur | 4H |
| Example 3 | 25/25 | some cracks occur | 4H |
| Example 4 | 25/25 | some cracks occur | 4H |
| Example 5 | 25/25 | no cracks | 4H |
| Example 6 | 25/25 | some cracks occur | 2H |
| Example 7 | 25/25 | some cracks occur | 2H |

*The numerical values of adherence indicate number of squares, out of 25 squares, to which the specimens remain adherent after peeling of tapes.
*"Allowed to cool" means that after baking of the coating, it is allowed to cool at room temperatures.

TABLE 4

| | Adherence (X/25) X: number of squares to which specimens adhere | Impact resistance | Pencil hardness |
|---|---|---|---|
| Example 1 Formulation 1 | 25/25 | some cracks occur | B |
| Example 1 Formulation 2 | 25/25 | no cracks | B |
| Example 1 Formulation 3 | 25/25 | no cracks | HB |
| Example 1 Formulation 4 | 25/25 | no cracks | HB |
| Example 2 | 25/25 | no cracks | H |
| Example 3 | 25/25 | no cracks | F |
| Example 4 | 25/25 | no cracks | HB |
| Example 5 | 25/25 | no cracks | 4H |
| Example 6 | 25/25 | no cracks | B |
| Example 7 | 25/25 | no cracks | H |

*"Water cooled" means that after 30 seconds following the baking of a coat, the coated specimen in is placed in water for cooling.

Results of Insulation Breakdown Test:

A test was conducted in accordance with the procedure of JIS-C-2110 on the specimen coated with the powder of Example 1, Formulation 4.

TABLE 5

| Coated film thickness ((m) | Rate of voltage increase (KV/sec) | Breakdown voltage (KV) |
|---|---|---|
| 370–390 | 1 | 13 |

*Condition: oil temperature 26.5° C., AC 50 Hz.

The above date indicate almost twice the insulation performance of commercial PET coated film products of equal film thickness.

The present invention imparts a metal adherence property to PET resins with low metal adhesion in order to allow their conversion to a powder coating. Furthermore, the invention selectively improves coating film performance characteristics such as impact resistance, hardness, boiling water resistance, and electrical insulation by varying modifier materials to be melt blended with PET resins. Thus, broad applications are expected for the present invention. Moreover, since recovered PET products can be used as raw material, in addition to PET resins, recovery and re-utilization of PET products can be facilitated.

Obviously, numerous modifications and variations of the present invention are possible in light of the above teachings. It is, therefore, to be understood that within the scope of the appended claims, the invention may be practiced otherwise than as specifically described herein.

What is claimed is:

1. A method for the preparation of a powder coating material, which comprises:

converting a melt blend of 100 weight parts of PET resin pellets or small pieces obtained from recovered PET resin molded products with 5–40 weight parts of a polyester resin (excluding PET) or a modified polyester resin to coarse pellets;

heating the pellets in order to increase the degree of crystallinity thereof to 35% or more; and machine grinding the pellets to particles below 350 $\mu$m.

2. A method of fine grinding a powder coating material, which comprises:

chemically grinding coarse pellets obtained from the molten mixture of a blend of 100 weight parts of PET resin pellets or small pieces obtained from recovered PET resin molded products with 5–40 weight parts of a polyester resin (excluding PET) or a modified polyester resin in dimethylacetamide solvent.

3. A method for the preparation of a powder coating material, which comprises:

converting a melt blend of 100 weight parts of PET resin pellets or small pieces obtained from recovered PET resin molded products with 5–40 weight parts of a polyester resin (excluding PET) or a modified polyester resin to coarse pellets;

heating the pellets to a temperature of 170° C. for several hours in order to increase the degree of crystallinity thereof to 35% or more; and machine grinding the pellets to particles below 350 $\mu$m.

4. A method for the preparation of a powder coating material, which comprises:

converting a melt blend of 100 weight parts of PET resin pellets or small pieces obtained from recovered PET resin molded products with 5–40 weight parts of a polyester resin (excluding PET) or a modified polyester resin to coarse pellets;

heating the pellets to a temperature of 166±10° C. in order to increase the degree of crystallinity thereof to 35% or more; and machine grinding the pellets to particles below 350 $\mu$m.

* * * * *